United States Patent [19]

Shiomi et al.

[11] Patent Number: 4,534,692
[45] Date of Patent: Aug. 13, 1985

[54] MATERIAL FLOW SYSTEM FOR AUTOMATIC WAREHOUSES

[75] Inventors: Tadataka Shiomi; Kouichi Nabika, both of Gifu; Takashi Kawagoe, Shiga, all of Japan

[73] Assignee: Murata Kikai Kabushiki Kaisha, Kyoto, Japan

[21] Appl. No.: 654,036

[22] Filed: Sep. 21, 1984

Related U.S. Application Data

[63] Continuation of Ser. No. 380,776, May 21, 1982, abandoned.

[30] Foreign Application Priority Data

May 24, 1981 [JP] Japan ................................ 56-79007

[51] Int. Cl.³ ............................................. B65G 1/04
[52] U.S. Cl. .................................... 414/282; 414/222
[58] Field of Search ............... 414/277, 281, 282, 222

[56] References Cited

U.S. PATENT DOCUMENTS 3,549,025 12/1970 Messner ............................... 414/282
3,921,828 11/1975 Suizu ................................ 414/281 X
3,995,752 12/1976 Tamura et al. ....................... 414/282

FOREIGN PATENT DOCUMENTS 47277 4/1977 Japan ................................ 414/277
47278 4/1977 Japan ................................ 414/281
87469 8/1978 Japan ................................ 414/281

Primary Examiner—Joseph E. Valenza
Assistant Examiner—Stuart J. Millman
Attorney, Agent, or Firm—Spensley Horn Jubas & Lubitz

[57] ABSTRACT

Herein disclosed is a materials flow system for an automatic warehouse, which is intended to eliminate any loss in the standby time of a worker during a machining process and to unman the machining process itself. The materials flow system includes a first stacker crane which is interposed between two automatic warehouses arranged in parallel for transferring materials to either of the warehouses. Further inclusive is a second stacker crane which is disposed in front of either of the automatic warehouses and which are equipped with two sets of slide forks for simultaneously transferring two materials between the warehouses.

6 Claims, 4 Drawing Figures

MATERIAL FLOW SYSTEM FOR AUTOMATIC WAREHOUSES

This is a continuing application of Ser. No. 380776, filed May 21, 1982, now abandoned.

BACKGROUND OF THE INVENTION

The present invention relates to a materials flow system for an automatic warehouse.

A stacker crane having a movable frame carrying locked forks into and out of a storage rack with the forks being changeable in their direction of sliding is known by U.S. Pat. No. 3,747,790. However, according to the prior art, either an intermediate product or a finished product is transferred by the single reciprocation of the stacker crane so that a complete transfer between intermediate product and finished product requires at least two shifting operations.

SUMMARY OF THE INVENTION

It is an object of the present invention to provide a materials flow system for an automatic warehouse, which is intended to eliminate any loss in the standby time of a warehousing or delivering worker during a machining process and to unman the machining process.

According to a feature of the present invention, there is provided a materials flow system for an automatic warehouse, which comprises a first stacker crane interposed between two automatic warehouses arranged in parallel for transferring materials to either of said automatic warehouses; and a second stacker crane disposed in front of one of said automatic warehouses and having two sets of slide forks for simultaneously transferring two materials to and from the front automatic warehouse.

Both of the intermediate products or the finished products can be transferred by the single reciprocation according to the present invention so that the standby time of a worker at a setting area can be reduced to one half to remarkably improve the warehousing and delivering efficiency of the warehouses. Moreover, if numerically control pallets are set in advance with the immediate products to be worked and are housed in the automatic warehouses, unmanned operations at night can be put into practice without any difficulty.

BRIEF DESCRIPTION OF THE DRAWINGS

Other objects and advantages of the present invention will become apparent from the following description taken in conjunction with a preferred embodiment with reference to the accompanying drawings, in which.

DESCRIPTION OF THE PREFERRED EMBODIMENT

The present invention will now be described in detail in connection with a preferred embodiment thereof with reference to the accompanying drawings.

Figure 1:
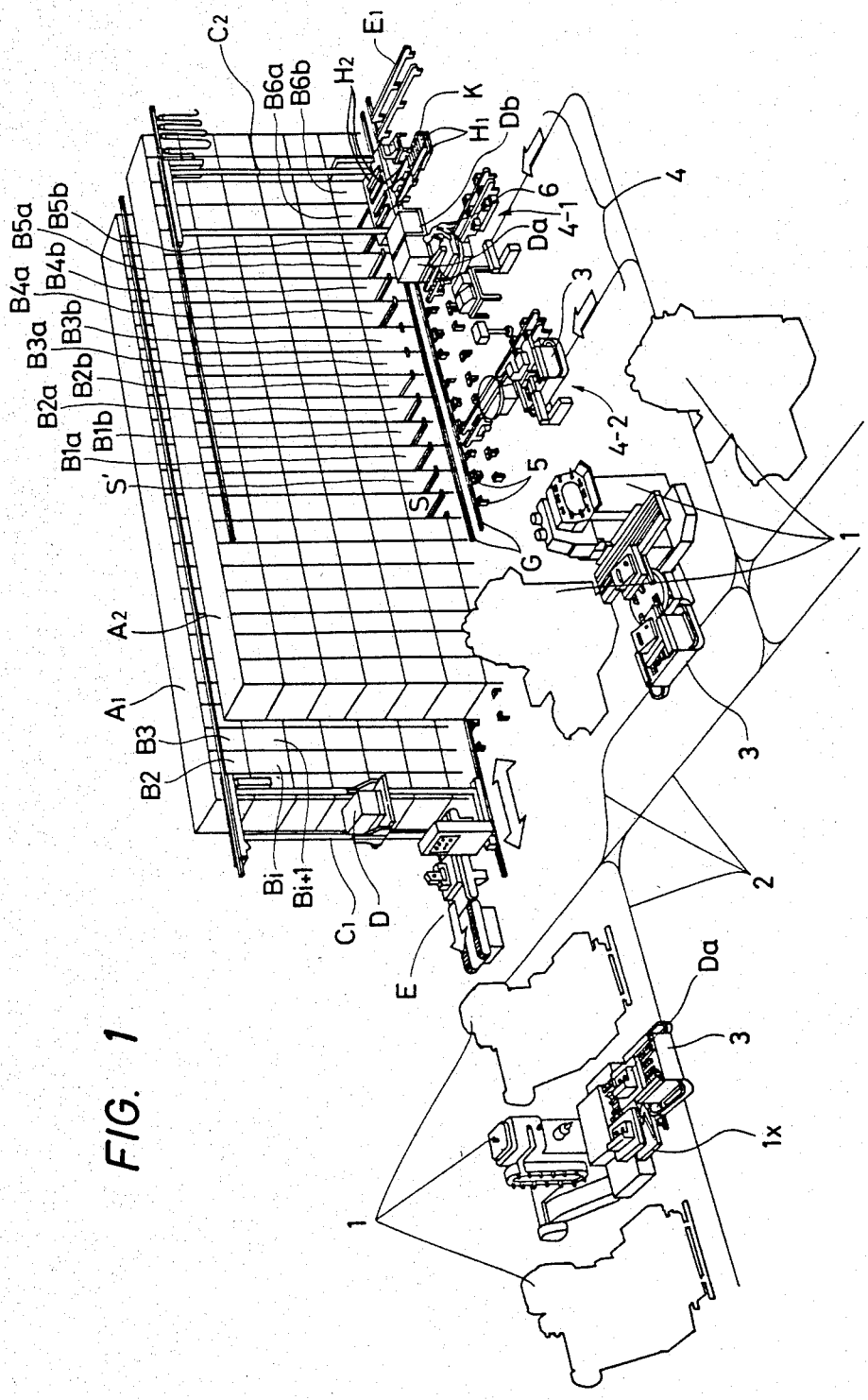
FIG. 1 is a perspective view showing the whole construction of a materials flow system according to a preferred embodiment of the present invention.
Figure 2:
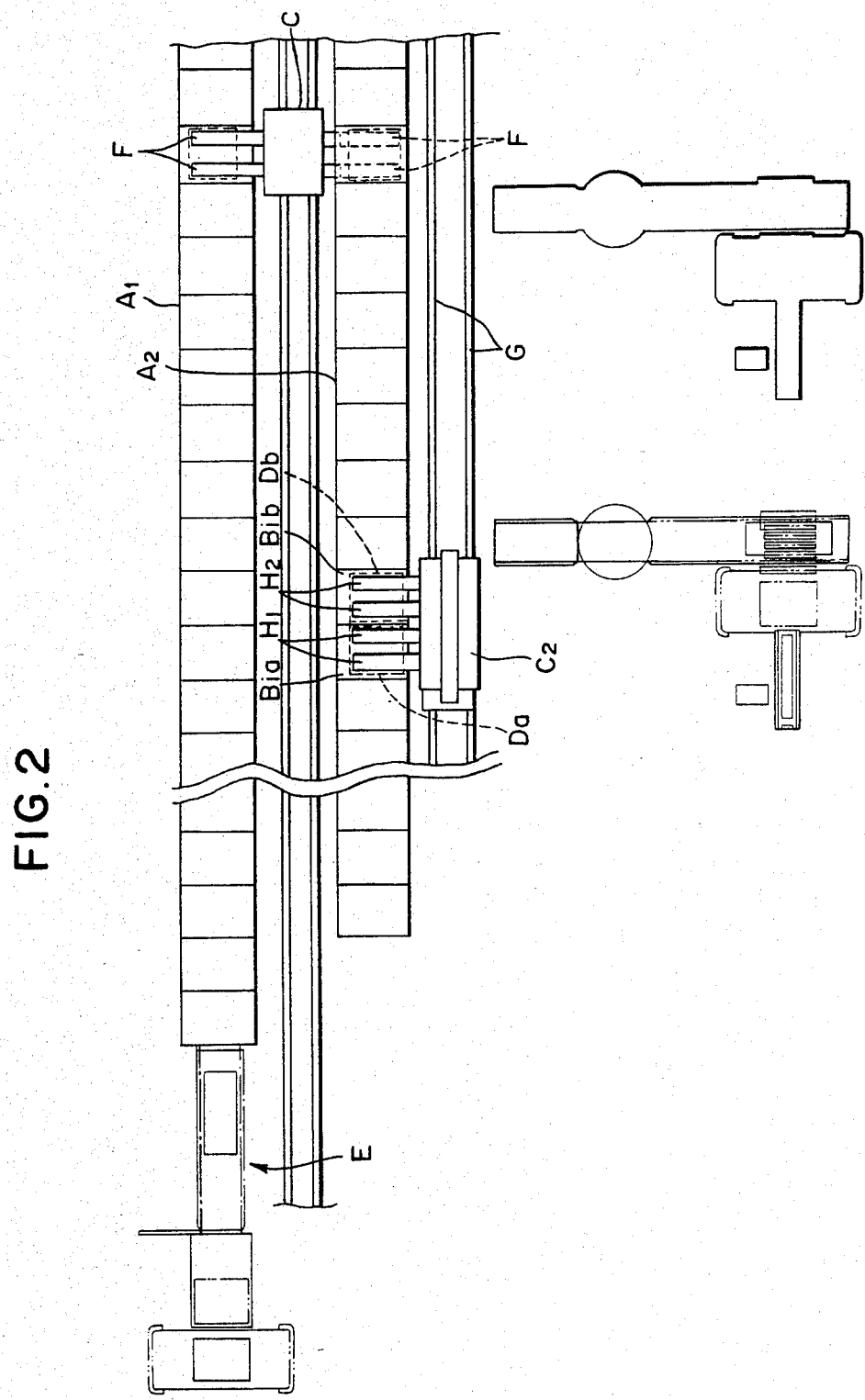
FIG. 2 is a top plan view showing a warehouse portion of the system of FIG. 1.

In the present invention, at least two automatic warehouses A1 and A2 are arranged in parallel to each other, as shown in FIG. 1.

The automatic warehouses A1 and A2 house all the materials necessary for practicing the present system, such as wood plate pallets loaded with the materials or jigs (which will be shortly referred to as "pallets") or numerically controlled machine pallets set with the materials or jigs (which will be shortly referred to as "NC pallets") in a variety of modes. Each warehouse is composed of a plurality of housing blocks B1, B2, B3—, Bi and so on which are independent of one another. The lowermost rack of the front second warehouse A2 is partially allotted for warehousing and delivering stations S and S' and for standby stations B1a and B1b, B2a and B2b, B3a and B3b,—, and B6a and B6b such that the warehousing and delivering stations and the standby stations are constructed of paired two right and two left blocks S and S', and B1a and B1b and so on. Moreover, the aforementioned respective pairs of blocks S and S', and B1a and B1b, etc., allow the materials to be inserted or extracted from both their front and back, whereas the remaining blocks allow the insertion or extraction of the materials to be effected only from the side of a first stacker crane C1.

The aforementioned warehousing and delivering stations S and S' provide passages which are used to warehouse or deliver the materials necessary for works at a later-described setting area into and out of the automatic warehouses.

The aforementioned standby stations B1a and B1b, B2a and B2b and so on provide intermediate buffers for temporarily storing for each machining tool either the pallets loaded with the materials for the lot at work or the pallets loaded with finished goods.

Between and in parallel with the two warehouses A1 and A2, there runs the first stacker crane C1 which is made operative to transfer goods boxes D (each carried by a pallet) from the warehouse A1 to the warehouse A2, from the warehouse A2 to the warehouse A1, or from the warehouse A1 or A2 to a warehousing and delivering station E. As a result, that crane C1 has its slide fork F constructed such that it can translate into and out of blocks in both the first and second warehouses A1 and A2. In front of the second warehouse A2, there is a second stacker crane C2 which is guided by rails G to run in parallel with the warehouse A2. The second stacker crane C2 is equipped with two sets of slide forks H1 and H2. These slide forks H1 and H2 are made operative such that both of them simultaneously move back and forth to simultaneously warehouse or withdraw goods boxes Da and Db to or from a pair of standby stations Bia and Bib. Alternatively, the slide forks H1 and H2 may be controlled so that only one of them moves back and forth to warehouse or withdraw the goods box Da or Db to or from the single block Bia.

Figure 3:
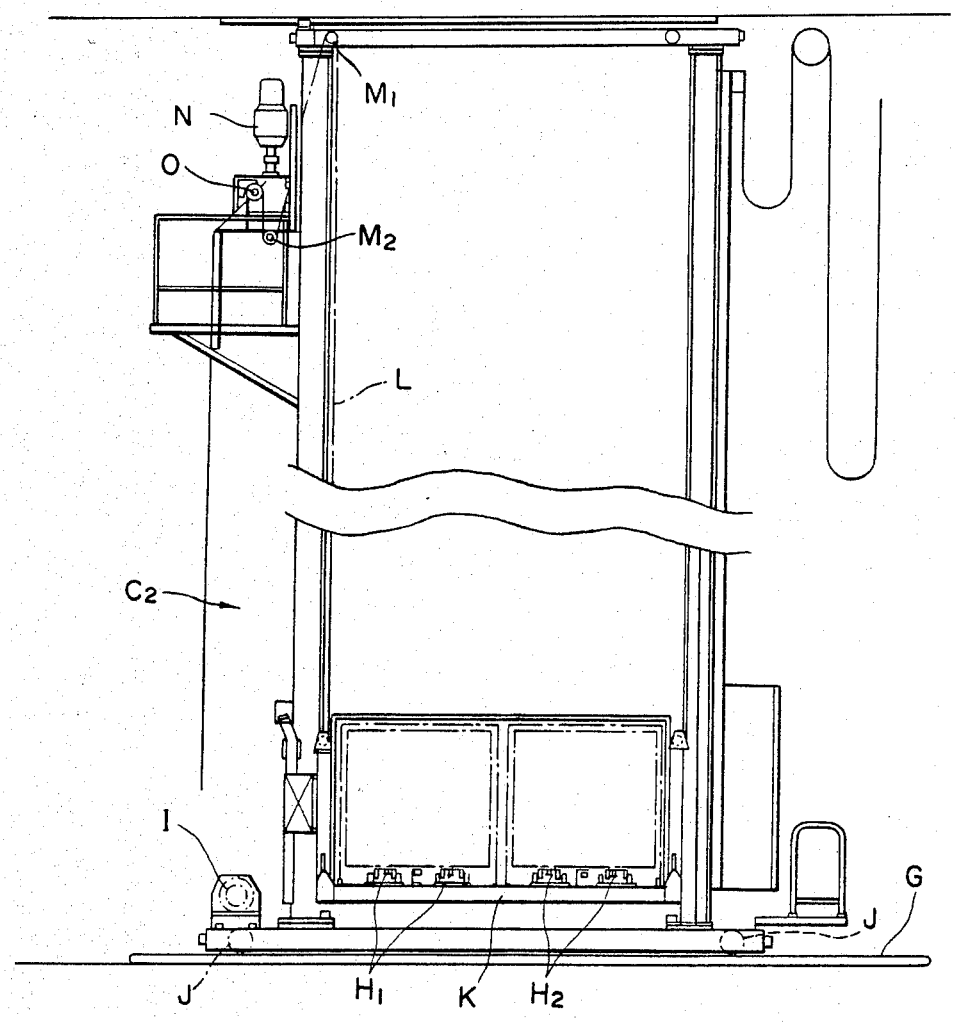
FIG. 3 is a front elevation view showing a second stacker crane in accordance with the system of FIG. 1.
Figure 4:
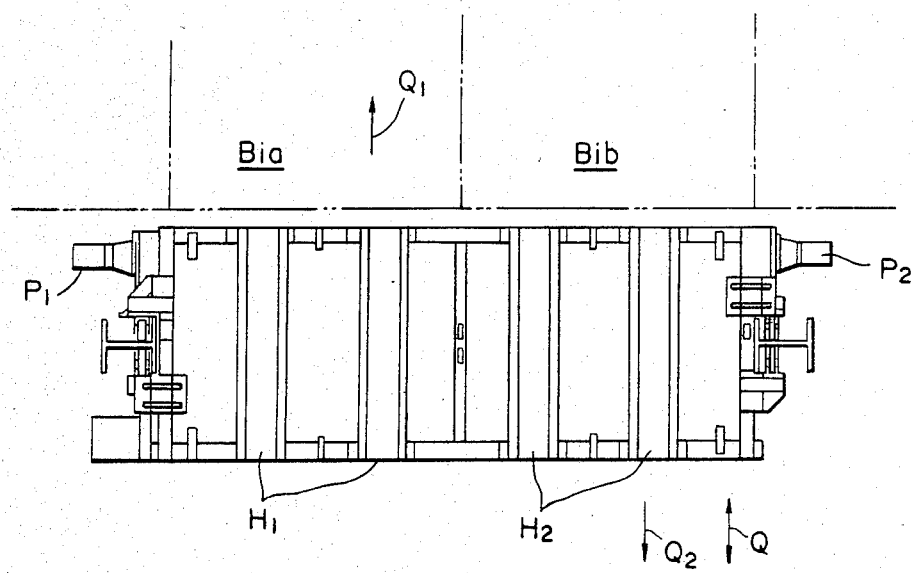
FIG. 4 is a top plan view of the second stacker crane of FIG. 3.

FIG. 3 is a front elevation showing the stacker crane C2 having those two forks H1 and H2 and adapted to run on rails G by means of wheels J whcih are driven by a running motor I. The two sets of slide forks H1 and H2 are mounted on a lift K of the crane C2, and a chain L having its one end affixed to the lift K is made to run through intermediate sprockets M1 and M2 and through a drive sprocket O which in turn is connected to a motor N. As a result, the lift K is moved up and down by the action of the chain L which is pulled by the sprocket O in accordance with the rotations of the motor N. On the lift K, as shown in FIG. 4, there are mounted two reversible motors P1 and P2, which operatively move the slide forks H1 and H2, respectively, in the direction of arrows Q. As a result, the slide forks H1 and H2 can be brought forward or backward together with each other by the synchronous operation of the motors P1 and P2, or they can be moved separately of each other by independent operation of the motors P1 and P2.

The procedures of the materials flow in the system thus constructed will be explained in the following. The finished workpieces in a goods box Da, having been machined by one of the machining tools 1, are carried on a corresponding automatic trailer 3, which is guided by guidelines 2 laid on the floor, so that they are transferred to a setting area 4. The setting area 4 is equipped with stationary platforms 5, on which two goods boxes Da and Db may be placed in pairs. These goods boxes Da and Db are such that one is empty and the other is filled with one or a plurality of finished or intermediate products. For example, at the initial state to start the machining operations of products X, the intermediate products have to be fed to the machining tools. A goods box filled with the intermediate products and a vacant box are stored as a pair in the standby blocks Bia and Bib of the warehouse A2 by the actions of the stacker crane C1 or the stacker crane C2. When a system control computer generates a workpiece setting command, both the goods box filled with the intermediate products sufficient to produce one lot of the products X and the vacant box are extracted as a pair by the action of the stacker crane C2 and they are transferred to the stationary platforms 5.

When the loading operations, explained more fully below, of an NC pallet with the workpieces from the goods box containing the intermediate products are ended at said position, the control computer feeds out a "set end" signal to a warehouse and delivery setting board. Then, the NC pallet having been set is temporarily stored in an assigned housing block of either the automatic warehouse A1 or A2 by transferring the NC pallet to the warehousing and delivering station S via the second stacker crane C2 and then from the station S to the assigned housing block by means of the first stacker crane C1. In response to a demand signal from the machining tool, the aforementioned set NC pallet stored is retrieved from the assigned housing block and is delivered to the warehousing and delivering station E by the action of the first stacker crane C1 where it is transferred to the standby automatic trailer 3 on which it is conveyed to the corresponding machining tool. Concurrently, the goods boxes on the platforms 5 are housed into the original standby box Bia and Bib by the action of the stacker crane C2. In accordance with the command of the computer, the automatic trailer 3 carried the intermediate products on the NC pallet from the station E to the designated machining tool so that the intermediate products may be machined. At the machining tool, the intermediate products are transferred from the NC pallet one by one to the machining tool and are machined. When these machining operations are completed, an "end" signal is fed to the computer.

In response to this signal, the computer controls an automatic trailer 3 to run to the machining tool having generated that signal, to receive the NC pallet containing the finished products X and to carry them to the setting area. Concurrently, the computer feeds a command to the stacker crane C2 so that both the vacant box and the goods box filled with intermediate products are extracted from the blocks Bia and Bib and transferred to the setting area.

In the event that identical workpieces are to be consecutively machined, a worker 6 puts the finished products from the NC pallet into the aforementioned vacant box and extracts a necessary number of intermediate products from the other goods box, placing them on the NC pallet. After the setting operation, the worker 6 sends the intermediate products, using the second stacker crane C2, through the automatic warehouse A2, to the first stacker crane C1 and thence to the automatic trailer at station E. By repeating these operations, the number of the finished products in the goods boxes housed in the standby stations Bia and Bib is increased whereas the number of intermediate products is decreased. When the number of the finished products in one goods box reaches a predetermined quantity comprising a lot, the stacker crane C1 responds to a command from the computer to transfer that box to a designated block of the first warehouse A1. In place of this, a box filled with intermediate products and housed in advance in that block of the first warehouse A1 is fed to the standby station of the warehouse A2, from which the box of the finished products has been just extracted. Thus, the standby stations Bia and Bib are again housed with a vacant box and a box filled with intermediate products. The box having the intermediate products is placed in advance in the warehouse A1 by the action of the stacker crane C1, whereas the box having a predetermined lot quantity of finished products and transferred to the warehouse A1 may be subsequently carried out of the system by the action of the stacker crane C1.

As a result, at night or the like when there is no worker in the setting area, the NC pallets set in advance with the intermediate products are already housed in the automatic warehouses A1 and A2. Then, the NC pallets of intermediate products are taken from the warehouses A1 and A2 by the first stacker crane C1 and are consecutively fed to the machining tools by the aforementioned automatic operations so that they are machined. The NC pallets returned to the setting area after having their intermediate products machined, are taken from the setting area by the second stacker crane C2 and are housed, as they are, in predetermined blocks of the automatic warehouses A1 and A2 by passing them through the warehousing and delivering station S or S' from whence they are further relocated by the action of the stacker crane C1. On the next working day, when the worker arrives, he may carry the machined products, which were finished and housed throughout the night, in a consecutive manner out of the warehouses and remove the finished products from the NC pallets. Thus, the unmanned operations at night are accomplished.

The stacker crane equipped with the paired slide forks H1 and H2 as shown in FIG. 4 can also be used as the first stacker crane C1. In this case, one slide fork H1 is inserted into the block of the warehouse A1 in the direction of arrow Q1, and at the same time the other slide H2 is inserted into the block of the warehouse A2 in the direction of the arrow Q2. By only slight repositioning of the first stacker crane C1 thus equipped, the two slide forks H1 and H2 can effect the exchange for the two blocks. Although, in the foregoing embodiment, the goods box is transferred as a unit, the articles to be transferred by the system of the present invention need not be limited thereto but can include the transfer of pallets loaded with parts, tools, jigs and so on.

We claim:

1. A materials flow system for an automatic warehouse serving to supply materials to and store materials from a plurality of work stations, comprising:
   a pair of automatic warehouses arranged to be mutually parallel, each automatic warehouse having a plurality of housing blocks;
   a first stacker crane interposed between the two automatic warehouses arranged in parallel, adapted to be capable of transferring materials to, from, and between either of said automatic warehouses;
   at least one automatic trailer;
   at least one delivery station, disposed adjacent said automatic warehouses and adapted to receive materials from the first stacker crane and to deliver materials to the automatic trailer, and the reverse;
   a second stacker crane, disposed in front of either of said automatic warehouses, said second stacker crane having two sets of slide forks for simultaneously transferring two materials to or from a pair of side-by-side housing blocks of said automatic warehouse adjacent said second stacker crane;
   at least one setting station, disposed adjacent the second stacker crane, each of said at least one setting station being capable of receiving two materials, said second stacker crane being further adapted to simultaneously transfer two materials to or from the at least one setting station;
   means for transferring materials between the at least one setting area and the at least one automatic trailer; and
   means for controllably guiding the at least one automatic trailer between said at least one delivery station, each of said plurality of work stations, and said at least one setting station.

2. A materials flow system as claimed in claim 1, wherein the plurality of independently addressable housing blocks of each automatic warehouse are independently controllably accessible by said first stacker crane;
   and wherein the lowermost rack of said second automatic warehouse adjacent said second stacker crane is partially allotted to form at least one pair of right and left housing blocks, said respective paired housing blocks being controllably accessible as a pair to allow the simultaneous insertion or extraction of the materials to be effected by said second stacker crane.

3. A material flow system as claimed in claim 2, wherein said first stacker crane comprises:
   at least one slide fork operatively adapted to go into and out of the housing blocks of both of the first and second automatic warehouses of the pair of automatic warehouses; and
   means for controllably elevating the at least one slide fork and for translating said first stacker crane between the pair of automatic warehouses such that the slide fork may controllably access each housing block of each automatic warehouse; and
   wherein said second stacker crane comprises:
   two sets of slide forks, said slide forks of the second stacker crane being operatively adapted to enable both sets of slide forks to simultaneously move back and forth to simultaneously warehouse or deliver materials into and out of a pair of standby housing blocks, and controllably adapted such that only one of the two sets of slide forks moves back and forth to warehouse or deliver a materials into and out of a single housing block;
   means for simultaneously controllably elevating the two sets of slide forks; and
   means for controllably translating the second stacker crane in parallel with either of the pair of automatic warehouses.

4. A materials flow system for an automatic warehouse serving to supply materials to and store materials from a plurality of work stations, comprising:
   two automatic warehouses, each composed of a plurality of independently addressable housing blocks arranged in vertical columns and horizontal racks, said two automatic warehouses extending in parallel to each other, each of said housing blocks in each of said automatic warehouses being accessible to a space between said two automatic warehouses;
   a first stacker crane interposed between said automatic warehouses;
   means for horizontally translating and positioning said first stacker crane within the space between said two automatic warehouses along the extent of said automatic warehouses;
   means for lifting a platform on said first stacker crane to an elevation corresponding to one of said addressable housing blocks of said automatic warehouses;
   means, carried by said lift of said first stacker crane, for transferring a unit of material to or from a controllably selected one of said housing blocks of either of said automatic warehouses;
   an automatic trailer, adapted to convey a unit of material along a guideway in a controllably determinable manner between terminals appropriately disposed in proximity to said automatic warehouses and each of the plurality of work stations;
   a delivery station, disposed adjacent said automatic warehouses so as to be accessable by said first stacker crane such that a unit of material may be transferred in either direction between the delivery station and the first stacker crane and transferred in either direction between the delivery station and the at least one automatic trailer;
   a second stacker crane, horizontally displacable parallel and adjacent to the extent of one of said automatic warehouses on the side of said one of said automatic warehouses opposite that adjacent to said first stacker crane, said second stacker crane being provided with two sets of means for transferring materials to and from designated pairs of horizontally adjacent housing blocks of said one of said automatic warehouses accessable from the side adjacent said second stacker crane; and
   means for receiving and holding pairs of units of material, disposed adjacent said second stacker crane and further adapted to be accessable for transferring units of material to and from said at least one automatic trailer.

5. A material flow system as claimed in claim 4, wherein said two sets of means for transferring materials, provided on said second stacker crane, are independently controllably operable to act singly to transfer materials to and from one of said housing blocks, or in addition to being operable to act in concert to transfer a pair of units of materials to and from a horizontally adjacent pair of said housing blocks.

6. A materials flow system as claimed in claim 4, wherein said first stacker crane further comprises a second means, carried by said lift of said first stacker crane, for transferring materials to or from a housing block of either of said automatic warehouses, said second means for transferring materials being disposed adjacent said first means for transferring materials such that said first means for transferring materials and said second means for transferring materials may be controllably operated so as to access a pair of horizontally adjacent housing blocks in one of said automatic warehouses, and each may be controllably operated to independently and simultaneously access a differing housing block in either of said automatic warehouses.

* * * * *